(12) United States Patent
Kusumoto

(10) Patent No.: US 6,894,862 B2
(45) Date of Patent: May 17, 2005

(54) SERVO SYSTEM WITH LEARNING FUNCTION FOR ACHIEVING SERVO COMPENSATION IN A DISK DRIVE

(75) Inventor: Tatsuharu Kusumoto, Higashiyamato (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 69 days.

(21) Appl. No.: 10/653,085

(22) Filed: Sep. 3, 2003

(65) Prior Publication Data

US 2004/0042114 A1 Mar. 4, 2004

Related U.S. Application Data

(62) Division of application No. 09/663,349, filed on Sep. 15, 2000, now Pat. No. 6,650,499.

(30) Foreign Application Priority Data

Dec. 28, 1999 (JP) .......................................... 11-375290

(51) Int. Cl.[7] .............................................. G11B 5/596
(52) U.S. Cl. ................................................... 360/77.04
(58) Field of Search ............................... 360/77.04, 25, 360/53

(56) References Cited

U.S. PATENT DOCUMENTS

| | | | |
|---|---|---|---|
| 4,530,020 A | 7/1985 | Sutton | |
| 4,536,809 A | 8/1985 | Sidman | |
| 4,630,190 A | 12/1986 | Alaimo et al. | |
| 4,697,127 A | 9/1987 | Stich et al. | |
| 5,426,545 A | 6/1995 | Sidman et al. | |
| 5,510,939 A | * 4/1996 | Lewis | ..................... 360/78.09 |
| 5,550,685 A | 8/1996 | Drouin | |
| 5,663,847 A | 9/1997 | Abramovitch | |
| 5,867,340 A | 2/1999 | Morehouse et al. | |
| 5,995,316 A | 11/1999 | Stich | |
| 6,310,742 B1 | 10/2001 | Nazarian et al. | |
| 6,414,812 B1 | 7/2002 | Hattori | |
| 6,437,936 B1 | 8/2002 | Chen et al. | |

FOREIGN PATENT DOCUMENTS

| | | |
|---|---|---|
| JP | 01-134602 | 5/1989 |
| JP | 06-203500 | 7/1994 |
| JP | 07-029335 | 1/1995 |
| WO | WO 93/06595 | 4/1993 |
| WO | WO 97/45833 | 12/1997 |

* cited by examiner

*Primary Examiner*—Sinh Tran
*Assistant Examiner*—Mitchell Slavitt
(74) *Attorney, Agent, or Firm*—Finnegan, Henderson, Farabow, Garrett & Dunner, L.L.P.

(57) ABSTRACT

Disclosed herein is a servo system for performing head positioning control in a disk drive, thereby to move the head to a desired position on a disk. The servo system perform a learning operation, thereby calculating a learned value relating to a disk-runout, and effects servo compensation to suppress a disk-runout, by using the learned value. Further, the servo system abandons erases the learned value in a memory when an impact applied to the disk drive and exceeding a tolerance value is detected during the learning operation.

1 Claim, 14 Drawing Sheets

SERVO SYSTEM WITH LEARNING FUNCTION FOR ACHIEVING SERVO COMPENSATION IN A DISK DRIVE

CROSS-REFERENCE TO RELATED APPLICATIONS

This is a division of application Ser. No. 09/663,349, filed Sep. 15, 2000 now U.S. Pat. No. 6,650,499, which is based upon and claims the benefit of priority from the prior Japanese Patent Application No. 11-375290, filed Dec. 28, 1999, which is incorporated herein by reference.

BACKGROUND OF THE INVENTION

The present invention relates to a disk drive having a servo system for performing head positioning control, and more particularly to a servo system that has a learning function for achieving servo compensation.

Hard disk drives (HDSs) have a servo system for achieving head positioning control. The servo system performs the head positioning control in accordance with the servo data prerecorded on a disk, thereby to move the head to a target position on the disk (a target cylinder or a target track). The servo system is a feedback control system comprising a component of which is a microprocessor (CPU). The CPU serves as the main controller of the HDD.

In manufacturing the HDD, a step known as "servo writing" is performed to record the servo data on the disk. More specifically, a servo track writer (STW) records servo data on the disk in the so-called sector servo scheme after the drive mechanism such as the head-disk assembly is incorporated into the housing of the HDD.

Generally, a number of cylinders (or track), which are concentric, are formed on the disk. Servo data items are recorded in each cylinder, spaced apart in the circumferential direction of the disk. It is desired that the servo data items be recorded at such positions as to define a perfectly circular cylinder as is indicated by the broken circle 31 shown in FIG. 3.

In the course of the servo writing, the disk 1 may undergo a runout, such as decentering or warping, when an impact is externally applied to the HDD or when the clamp mechanism holding the disk has but inadequate dimensional precision. Hereinafter, this undesirable phenomenon shall be referred to as "disk runout." When a disk runout occurs during the servo writing, the servo data items are recorded along a distorted circle as is indicated by the solid curve 30 in FIG. 3.

In the HDD, the servo system drives and controls the actuator 4, moving the head 2 to the target cylinder (or track) in order to write data in, or read data from, the target cylinder. The servo system controls the actuator 4 in accordance with the servo data the head 2 reads from the disk 1. If the disk 1 much warps and servo data items are recorded along a distorted circuit, the head 2 cannot read the servo data correctly, and the servo system cannot control the actuator 4 as is desired.

A new servo system has been developed for use in HDDs. The new servo system has a learning function. The servo system calculates the amount of a disk runout from the head-positioning error and perform servo compensation on the basis of the amount of disk runout. (The disk runout takes place in synchronism with the rotation of the disk.) The head-position error is calculated from the servo data the head has read, by means of position-error computation. The error represents the distance between the actual position of the head and the target position (in most cases, the center line of the target cylinder).

The new servo system obtains a servo compensation value (a correction value) for reducing the head position error resulting from the disk runout, from the disk-runout value calculated for the head by virtue of the learning function (hereinafter referred to as "learned value"). The servo compensation value thus obtained is supplied to the feedback control system incorporated in the servo system and is added to the control value of the feedback control system. More precisely, the learned value is calculated during each rotation of the disk and stored in a memory. The learned value is read from the memory, and a servo compensation value is obtained from the learned value, whenever necessary to perform the head positioning control. This servo system can control the disk runout, thereby to improve the precision of head positioning. This is because the feedback control system calculates a control value from the head-position error and adds the a servo compensation value to the control value, and performs servo compensation in accordance with the sum of the control value and the servo compensation value. A plant is actually controlled by the servo system is the voice coil motor (VCM) that drives the actuator holding the head.

Having the learning function, the servo system can suppress the instability of head positioning that occurs due to the disk runout. The servo system can therefore help to enhance the precision of head positioning. However, the servo system having the learning function is disadvantageous in the following respects.

First, the servo system may store a low-accuracy learned value (i.e., an erroneous learned value) into the memory. That is, the servo system performs the learning operation when the HDD incorporating the system is started, thus calculating a learned value and stores the value into the memory. If an external disturbance (e.g., an impact) is applied to the disk drive during the learning operation, the servo system fails to calculate an accurate learned value.

Second, the servo system will impair the precision of head positioning if it performs servo compensation in accordance with the sum of the control value calculated by feedback control and the servo compensation value obtained from a low-accuracy learned value read from the memory. In the worst case, the head positioning control the servo system performs may be less precise than the control performed by a servo system having no learning function.

BRIEF SUMMARY OF THE INVENTION

The object of the present invention is to provide a disk drive having a servo system which has a learning function and which can perform reliable, high-precision head positioning control even if the servo compensation is inadequate due to a low-accuracy learned value.

To attain the object, a disk drive according to the invention a servo system can perform a learning operation. In the learning operation, a learned value corresponding to a disk runout that occurs in synchronism with the rotation of the disk is calculated when the disk drive is started, and a servo compensation value (correction value) for suppressing the disk runout is obtained from the learned value. The servo system has a feedback control system. The feedback control system calculates a control value for driving an actuator designed to move a head. The servo compensation value is added to the control value by means of feedforward control.

The disk drive comprises memory means and control means. The memory means stores the learned value calculated by the learning means. The control means abandons the learned value (or erases the learned value in the memory means) if it infers that the learned value is an erroneous one.

The control means calculates a servo compensation value (correction value) form the learned value stored in the memory means and adds the servo compensation value to the control value during a normal read/write operation. The control means has means for determining whether the learned value deviates from a prescribed tolerance value due to an external disturbance or the like during the learning operation.

The learned value is abandoned if it is determined that the learned value deviates from the prescribed tolerance value during the learning operation performed at the start of the disk drive. Servo compensation is therefore prevented from being carried out on the basis of an erroneous learned value. This renders it possible to prevent the precision of head positioning from decreasing below the tolerance.

Moreover, the control means may be designed to store, into the memory means, the number of the head used in calculating the learned value, if the learned value is an erroneous one and abandoned. In this case, the control means repeats the learning operation a prescribed number of times, which is stored in a memory.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Embodiments of the present invention will be described, with reference to the accompanying drawings.

(Disk Drive)

Figure 1:
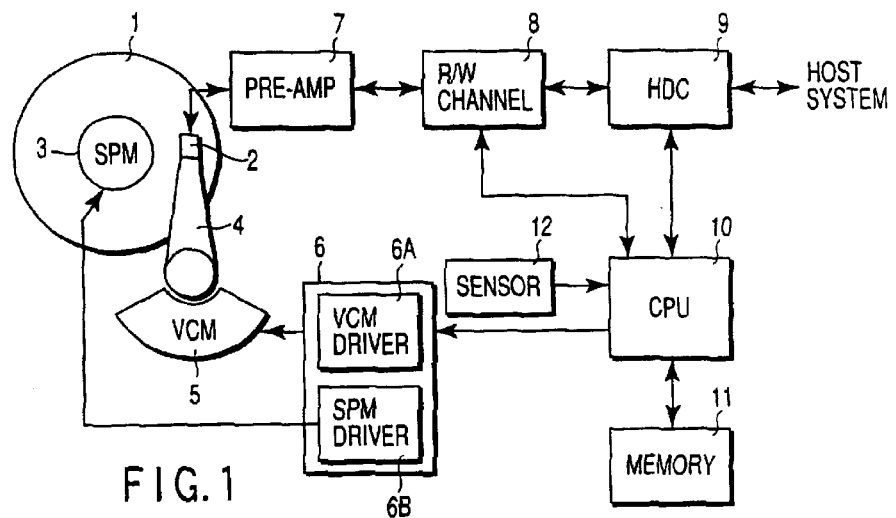
FIG. 1 is a block diagram of a disk drive according to the present invention.

The disc drive to which the embodiments are applied is a hard disk drive. As shown in FIG. 1, the disk drive has a disk 1 and comprises a head 2, a spindle motor (SPM) 3, an actuator 4, and a voice coil motor 5. The disk 1 is a data recording medium. The head 2 is designed to write and read data on and from the disk 1. The SPM 3 rotates the disk 1 at high speed. A number of concentric cylinders (tracks) are formed on the disk 1. Servo areas and data area are provided in each cylinder. The servo areas are spaced at regular intervals in the circumferential direction of the disk 1, with the data area provided among the servo areas. Servo data items are prerecorded in the servo area. The servo data is used to move the head 2 at a target cylinder (that is, to a desired position). User data can be recorded in the data areas.

The head 2 comprises a slider, a read head element and a write head element. The slider is the main body of the head 2. The head elements are mounted on the slider, spaced apart from each other. The head 2 is mounted on the actuator 4. The actuator 4 can be driven by the VCM 5. For simplicity of explanation, it is assumed that the disk drive has only one disk 1 and two heads 2. One of the heads 2 faces one surface of the disk 1, and the other head 2 faces the other surface of the disk 1.

The disk drive further comprises a motor driver IC 6, a preamplifier 7, a read/write (R/W) channel 8, a disk controller (HDC) 9, a CPU 10, a memory 11, and a sensor 12. The motor driver IC includes a VCM driver 6A and a SPM driver 6B. The VCM driver 6A supplies a drive current to the VCM 5. The VCM 5 is an object of control (or plant) in the verso system, in the narrow sense of the word. The SPM driver 6B supplies a drive current to the SPM 3, under the control of the CPU 10.

The preamplifier 7, or head amplifier circuit, selects one head 2 or the other. It supplies a write signal to the head 2 selected or receive a read signal therefrom. The R/W channel 8 process read signals and write signals, generates servo data and supplies the servo data to the CPU 10. The HDC 9 functions as an interface, controlling the transfer of commands, read data and write data between the R/W channel 8 and a host system. It works as a controller, too, for transferring read data and write data between the R/W channel 8 and the host system.

The CPU 10 is the main controller in the disk drive and the main component of the servo system. The CPU 10 performs the three main functions of the servo system, i.e., head positioning control, learning function and servo compensation. The memory 11 is a nonvolatile one, such as a flash EEPROM, in which data can be rewritten. The memory 11 stores the learned values generated by the CPU 10 and other data such as the head numbers.

The sensor 12 is provided to detect an external disturbance, such as an impact, applied to the disk drive. In the first embodiment that will be described later, the CPU 10 monitors the output of the sensor 12 during the learning operation, thereby determining whether or not an impact has been applied to the disk drive due to an excessive external disturbance.

(Servo System)

As described above, the CPU 10 is the main component of the servo system incorporated in the disk drive. Each head 2 reads and write data from and in the data area (a desired position) on the disk 1, in accordance with a read/write command supplied from the host system. This operation the head 2 performs shall be called "read/write operation" for the sake of brevity. The servo system drives the VCM 5, which moves the actuator 4. The head 2 is thereby moved to the desired position on the disk 1. Thus, the servo system accomplishes head positioning control, using the servo data prerecorded in the servo area provided on the disk 1.

Figure 2:
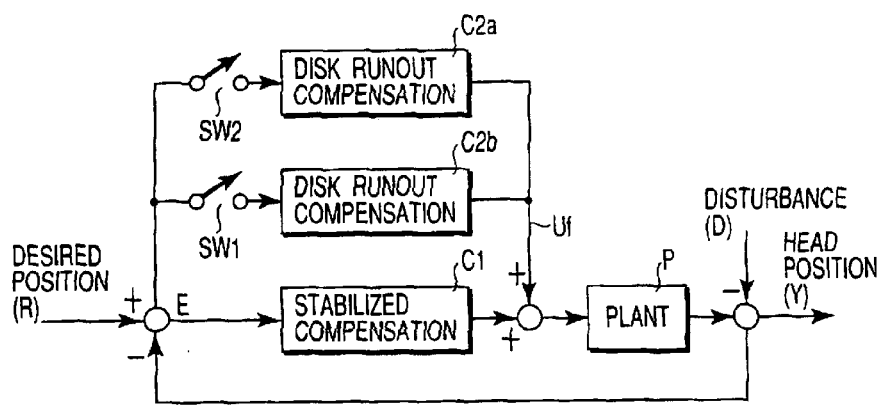
FIG. 2 is a block diagram illustrating the servo system incorporated in the disk drive of FIG. 1.

FIG. 2 is a block diagram illustrating the servo system. As shown in FIG. 2, the servo system comprises a feedback control system and a feedforward control system. The feedback control system controls the plant P (i.e., VCM 5) in accordance with a control value supplied from a stabilized compensation unit (or controller) C1. The feedforward control system supplies a servo compensation value Uf to the feedback control system.

The feedback control system finds the distance between the desired position R the head 2 should take and the position Y the head 2 takes at present. To be more specific, the desired position R, which the servo data represents, exist on the centerline of a cylinder. The distance between the position R and the head 2 is the position error E of the head 2. The controller C1 generates a control value that will eliminate the position error E.

Figure 3:
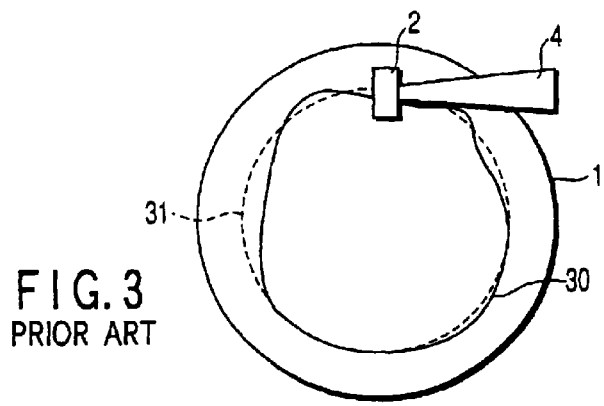
FIG. 3 is a diagram for explaining the servo data recorded on a disk provided in a conventional disk drive.

As indicated with reference to FIG. 3, the servo data is recorded along a distorted circle as indicated by the solid curve 30, when a disk runout occurs during the servo writing. In this case, there is an error $\Delta E$ that makes it impossible to reduce the position error E to nil.

The feedforward control system serves to suppress the error $\Delta E$. It generates a servo compensation value Uf. The value Uf is added to the control value output by the feedback control system (i.e., the controller), thereby suppressing the error $\Delta E$. The feedforward control system comprises an adaptive disk-runout compensation unit C2a, a learning disk-runout compensation unit C2b, and switches SW1 and SW2. When the switch SW1 is closed, the learning disk-runout compensation unit C2b is selected. When the switch SW2 is closed, the adaptive disk-runout compensation unit C2a is selected.

Both compensation units C2a and C2b are control elements for controlling the disk-runout component that corresponds to the rotational speed of the SPM 3. Each of the compensation units C2a and C2b performs a learning operation, obtaining a learned value including the amplitude and phase of the disk-runout component, and calculates a servo compensation value Uf from the learned value. More precisely, each compensation unit develops a Fourier series from the position error E obtained in the head positioning control. Each compensation unit (C2a, C2b) finds learned values for the respective servo areas provided in a cylinder allocated for the learning operation, and calculates servo compensation values Uf for the respective learned values. The servo compensation values Uf are stored into the memory 11. Like the feedback control system, the feedforward control system having the compensation units C2a and C2b is realized as the CPU 10 carries out various operations.

(Operation of the Feedforward Control System)

Immediately after the power-supply switch of the disk drive is closed, the switches SW1 and SW2 are turned on and off, respectively, in the feedforward control system. The learning disk-runout compensation unit C2b starts a learning operation, calculating a learned value. The learned valued is stored into the memory 11. To start the normal read/write operation, thereby to performs the head positioning control, both switches SW1 and SW2 are turned off. In this case, the learning disk-runout compensation unit C2b calculates a servo compensation value Uf from the learned value stored in the memory 11. The servo compensation value Uf is added to the control value of the feedback control system (i.e., the output of the controller C1).

If the precision of positioning the head does not increase, the switch SW2 is closed, thus turning on the adaptive disk-runout compensation unit C2a. The compensation unit C2a performs a learning operation, whenever necessary, with respect to the target cylinder during the read/write operation. In That is, the compensation unit C2a calculates a learned value and a servo compensation value Uf every time the head positioning control is carried out. The servo compensation value Uf is added to the control value of the feedback control system (i.e., the output of the controller C1), thus accomplishing servo compensation. Since the unit C2a performs as long as the switch SW2 remains closed, it may take a long time to move the head to the target cylinder, impairing the efficiency of the read/write operation. Thus, the switch SW2 is usually held open and is closed only the precision of positioning the head does not increase during the read/write operation.

(First Embodiment)

How the servo system according to the first embodiment of the invention perform a learning operation will be described, with reference to mainly the flowchart of FIG. 4. In the following description, the operation of the servo system shown in FIG. 2 will be regarded as the operation of the CPU 10.

The first embodiment is designed to initiate the learning operation when the disk drive starts operation (or immediately after the power-supply switch is turned on). In other words, the learning disk-runout compensation unit C2b shown in FIG. 2 performs a learning operation. To be more specific, the CPU 10 rejects the learned value calculated by the learning operation, if an impact D resulting from an external disturbance is applied to the disk drive. That is, the CPU 10 erase the leaned value in the memory 11 or sets value of "0" therein.

The sequence of the learning operation performed in the first embodiment will be explained with reference to the flowchart of FIG. 4.

First, the CPU 10 starts initial learning operation immediately after the power-supply switch of the drive is closed. The head 2 is moved to a learning cylinder, which has been selected from the many cylinders provided on the disk 1 (Step S1). That is, the CPU 10 carries out both the head positioning control, designating the learning cylinder as the target cylinder. This head positioning control is similar to the one carried out in the normal read/write operation.

The CPU 10 calculates a position error E from the servo data the head 2 positioned at the learning cylinder has read from the servo area of the learning cylinder. The position error E is calculated in the same way as in the course of the head positioning control achieved during the normal read/write operation. From the position error E the CPU 10 finds a leaned value that corresponds to the disk runout (Step S2).

If no impact resulting from an external disturbance is applied to the disk drive, the CPU 10 performs a learning operation for each servo area of the learning cylinder, while the time the disk 1 is rotating about 20 times. The learned value calculated for each servo area (e.g., the average of 20 learned values obtained while the disk 1 is rotating 20 times) is stored into the memory 11, along with the number assigned to the head 2 (Steps S5 and S6, if NO in Step S3).

The CPU 10 determines from the output of the sensor 12 whether or not the disk drive has received an excessive impact D (Step S3). If YES, the CPU 10 abandons the learned value stored in the memory 11 (Step S4). More specifically, upon completing the learning operation, the CPU 10 erase the learned value stored in the memory 11 or sets "0" as a learned value for the head number. If the CPU 10 has yet to complete the learning operation, it terminates the learning operation and sets "0" in the memory 11 as a learned value for the head number.

The initial learning operation thus performed stores in the memory 11 either an effective learned value or an invalid learned value (i.e., "0") for the head number. The CPU 10 uses the learned value stored in the memory 11, calculating a servo compensation value Uf, when the head positioning control is started in the normal read/write operation. The CPU 10 also calculates a control value for the VCM 5, by virtue of the feedback control system, and adds the servo compensation value Uf to the control value. The feedback control system uses the sum of the control value and the servo compensation value, suppressing the disk runout component (i.e., the position error ΔE). The head positioning control can thereby be achieved with high precision.

If the disk drive receives an impact due to an external disturbance during the initial learning operation, an erroneous leaned value will be very likely generated. The CPU 10 monitors the external disturbance using the sensor 12 and determines that the learned value is erroneous upon detecting that an excessive impact has applied to the disk drive. In this case, the CPU 10 abandon the leaned value. Hence, the CPU 10 does not performs servo compensation on the feedback control system during the normal read/write operation, because no valid learned values are stored in the memory 11. Inappropriate servo compensation using an erroneous learned value is thereby prevented. The precision of head positioning would not lower at all.

(First Modification of the First Embodiment)

Figure 5:
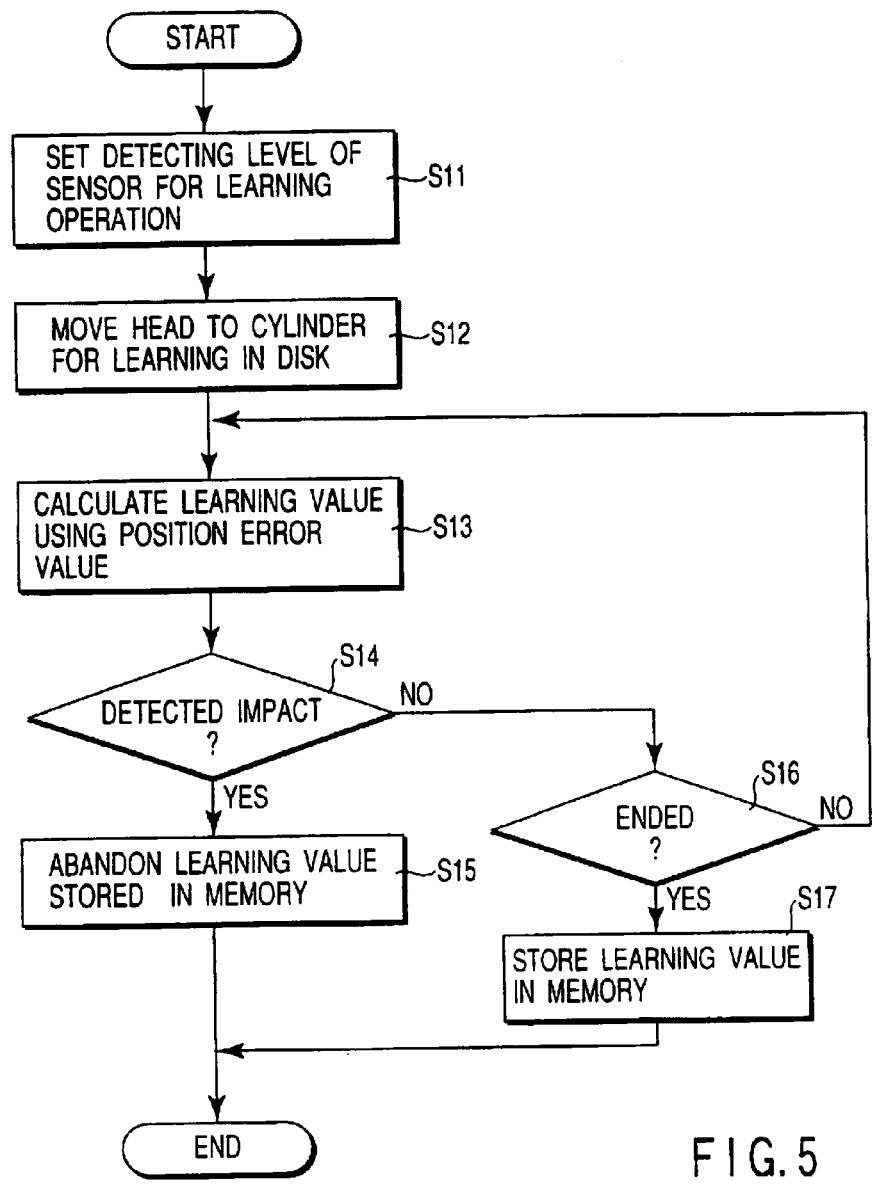
FIGS. 5 and 6 are flowcharts explaining the learning operation performed in a modification of the first embodiment of the invention.

FIG. 5 is a flowchart explaining the learning operation performed in a modification of the first embodiment of the invention.

The modified servo system is designed to set the detecting level of the sensor 12 at a specific value, thereby to perform a learning operation. That is, the detecting level is set lower than one for the normal read/write operation. The CPU 10 stops the read/write operation, suppressing the read/write error as much as possible, when it determines that the disk drive has received an excessive impact during the normal read/write operation.

During the initial learning operation, an impact applied to the disk drive can be absorbed unless the impact is an excessive one. If the detecting level of the sensor 12 is as high as the one for the normal read/write operation, the CPU 10 will more likely fail to perform the initial learning operation. Consequently, the possibility of generating a learned value will decrease. Hence, during the initial learning operation, the detecting level of the sensor 12 is set at such a low level that no erroneous learned value may be calculated (Step S11). Once the detecting level is so set, the learning operation is carried out in the sequence shown in FIG. 5, which is similar to Steps S1 to S6 illustrated in FIG. 4.

(Second Modification of the First Embodiment)

Figure 6:
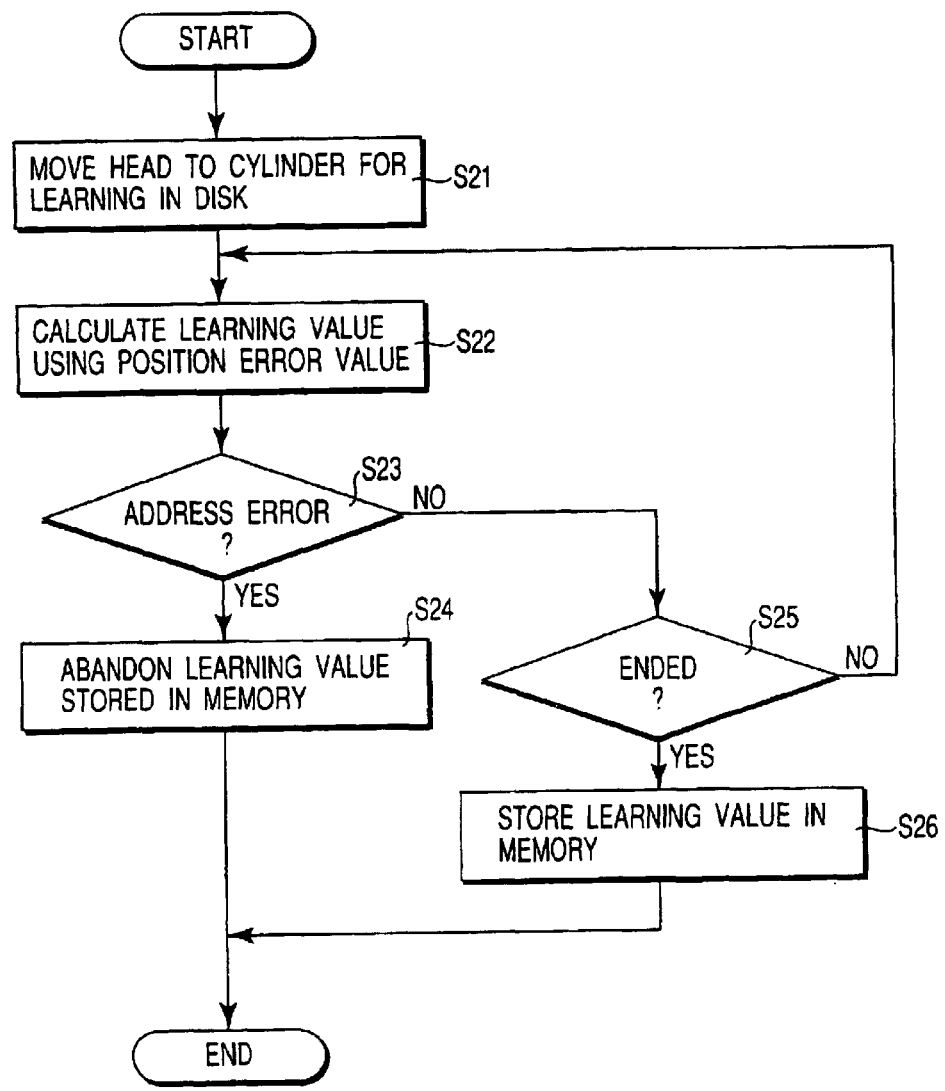

FIG. 6 is a flowchart explaining the learning operation performed in another modification of the first embodiment of the invention.

In this modification, it is determined whether or not the CPU 10 has calculated an erroneous learned value, in accordance with whether erroneous servo data, particularly an address error, has been reproduced, not in accordance with whether the sensor 12 has detected an impact.

As indicated above, the CPU 10 calculates a position error E from the servo data the head 2 has read from the learning cylinder to which the head 2 has been moved. The CPU 10 then obtains a learned value for the disk runout component, from the position error E thus calculated (Steps S21 and S22).

More precisely, the CPU 10 determines whether or not the address (e.g., cylinder code) contained in the servo data differs from the address allocated to the learning cylinder (Step S23). If YES, the CPU 10 determines that an address error has occurred. This means that the head 2 has shifted from the learning cylinder to another, due to the impact applied to the disk device, and has inevitably read the servo data prerecorded in the other cylinder.

If an address error has occurred, it is quite possible that the learned value the CPU 10 has calculated is an erroneous one. In this case, the CPU 10 abandons the learned value (Step S24). In practice, the CPU 10 sets "0" as the learned value for the head 2.

Figure 4:
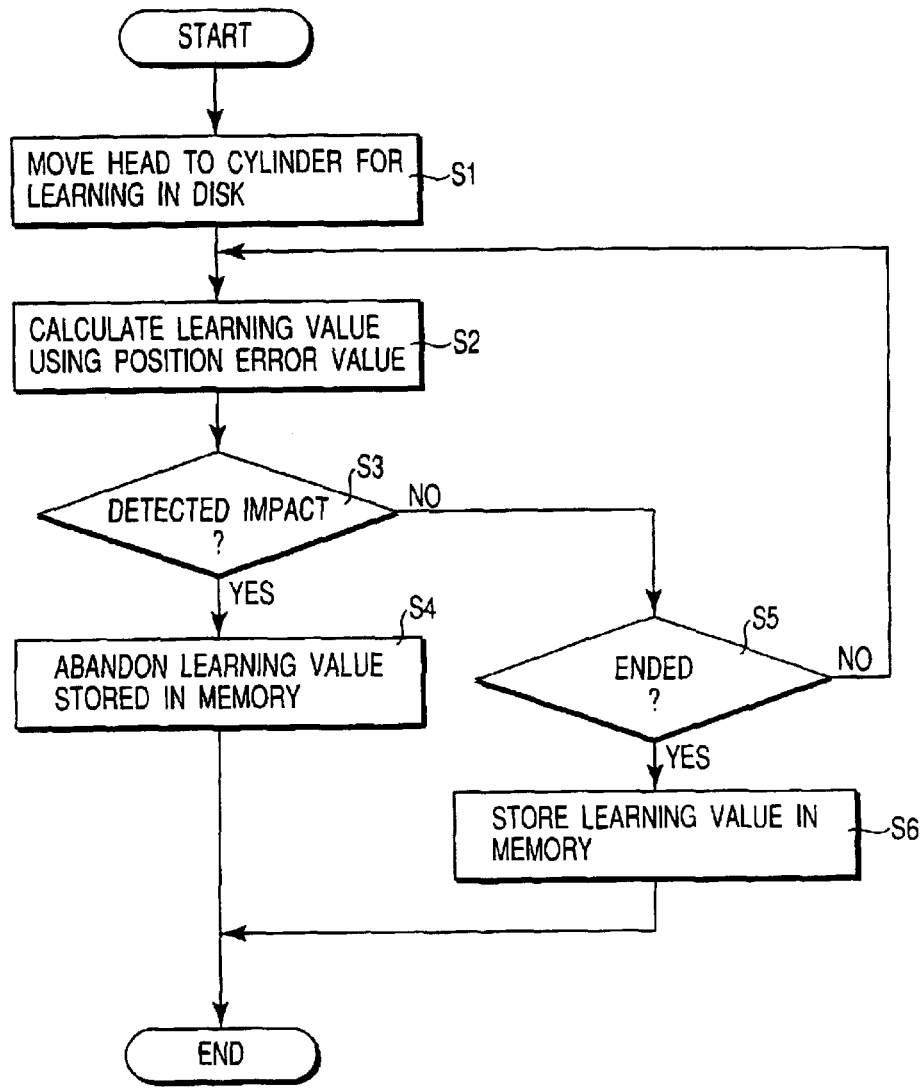
FIG. 4 is a flowchart showing the sequence of the learning operation performed in a servo system according to the first embodiment of the invention.

Steps S25 and S26 shown in FIG. 6 are similar to Steps S5 and S6 shown in FIG. 4.

(Second Embodiment)

Figure 7:
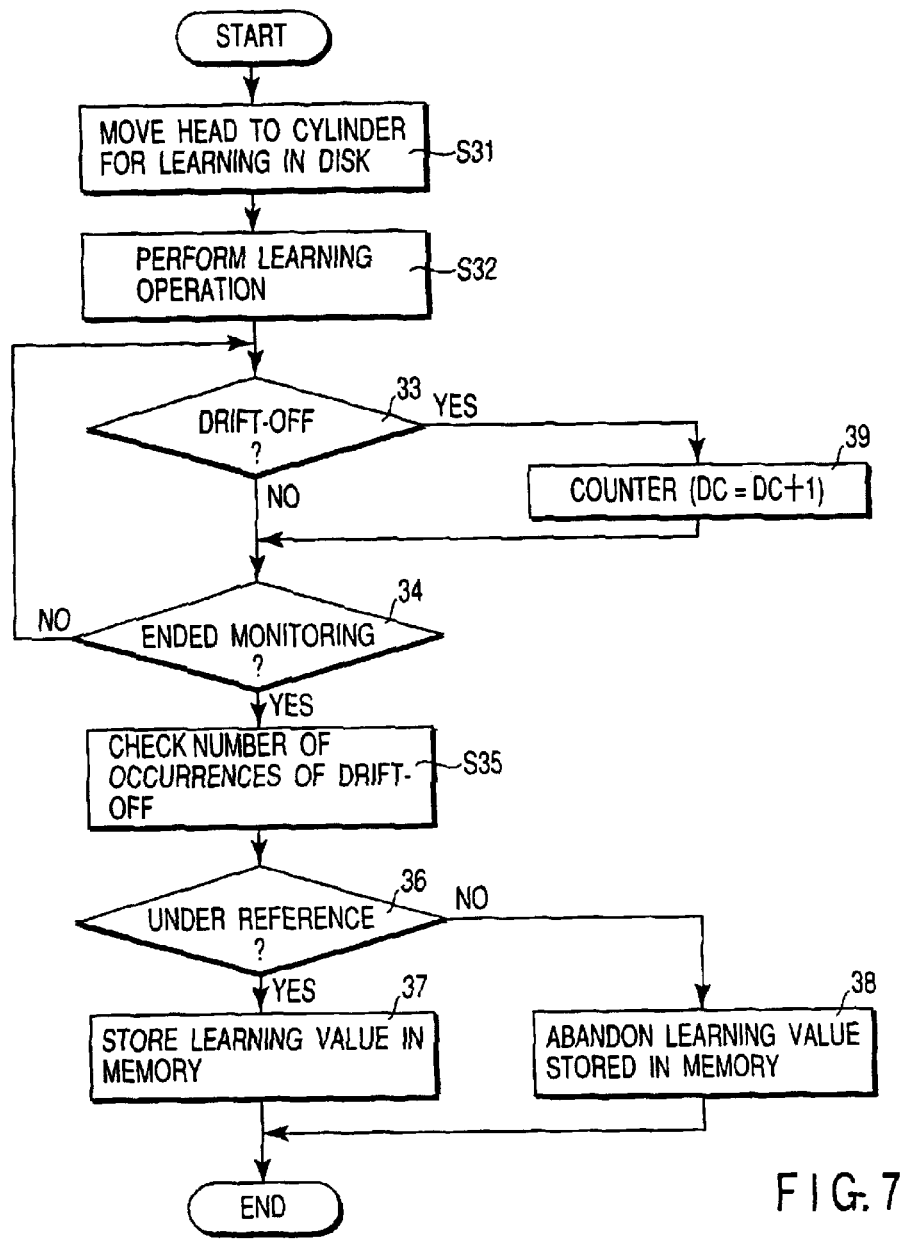
FIG. 7 is a flowchart showing the sequence of the learning operation carried out in a servo system according to the second embodiment of the invention.

FIG. 7 is a flowchart showing the sequence of the learning operation carried out in a servo system that is the second embodiment of the invention.

In the second embodiment, it is determined whether or not the CPU 10 has calculated an erroneous learned value, in accordance with whether a drift-off has occurred or not. The term "drift-off" means an excessive decrease in the precision of head positioning. More precisely, the term means that the head 2 has drifted from the target cylinder due to an external disturbance or the like, inevitably failing to read and write data from and on the target cylinder. Upon determining the occurrence of a drift-off, the CPU 10 inhibits the head 2 from writing data on the disk 1.

In the second embodiment, the CPU 10 determines whether a drift-off has occurred or not, from the position error E that has been used in the learning operation after the initial learning operation.

How the learning operation is achieved in the second embodiment will be described with reference to the flowchart of FIG. 7.

When the initial learning operation is started, the CPU 10 moves the head 2 to the learning cylinder (Step S31). The CPU 10 calculates a position error E from the servo data the head 2 has read from the learning cylinder and performs the learning operation until it obtains from the position error E a learned value relating to the disk runout (Step S32). The learned value is stored into the memory 11, together with the number of the head 2.

After the completion of the learning operation, the CPU 10 determines from the position error E whether the head 2 has undergone a drift-off or not (Step S33). If the CPU 10 determines that a drift-off has occurred, the head 2 is considered to have moved from the learning cylinder at which had once been positioned in accordance with the learned value.

The CPU 10 then counts the number of times the drift-off has occurred, obtaining a count DC (Step S39). If NO, the operation goes to Step S34. If YES, the operation goes to Step S39, in which a counter (not shown) increases its count by one. The CPU 10 determines whether a prescribed monitoring time has passed or not (Step S34). If NO, the operation returns to Step S33. If YES, the CPU 10 checks the number of times the drift-off has occurred (Step S34). Then, the CPU 10 determines whether the number of times checked is less than a prescribed value or not (Step S36). If YES in Step S36, the CPU 10 determines that the initial learning operation has normally ended, and stores the initial learned value into the memory 11 together with the head number (Step S37).

If the number of times is equal to or greater than the prescribed value, the CPU 10 determines that the learned value is erroneous, and abandons the initial learned value and stops performing the learning operation (Step S38). More specifically, the CPU 10 sets "0" as the learned value for the head identified by the head number.

As described above, the CPU 10 abandons any learned value obtained during the learning operation if a drift-off occurs after the learning operation. Hence, no erroneous learned values are used when the normal head positioning control starts. This prevents a noticeable decrease in the precision of head positioning.

It is desired that the reference drift-off level be lower in the initial learning operation than in the normal read/write operation. If the reference drift-off level is as high as, or higher than, in the normal read/write operation, the efficiency of the normal read/write operation will decrease, though it is possible to suppress the position error to the upper limit of the drift-off when the learned value is an erroneous one.

(Third Embodiment)

Figure 8:
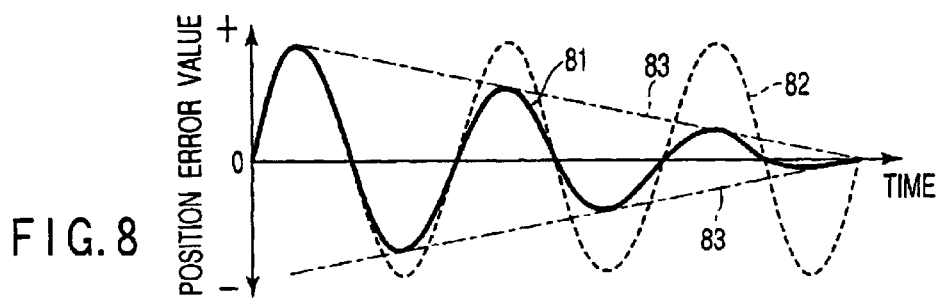
FIGS. 8 and 9 are diagrams explaining how the learning converges in the third embodiment of the invention.

A servo system according to the third embodiment of the invention will be described, with reference to FIGS. 8, 9 and 10. In the third embodiment, whether the learned value calculated in the learning operation is erroneous or not is determined in accordance with how the learned value converges.

As indicated above, the servo data prerecorded on the disk 1 become incorrect if a disk runout takes place while the disk 1 is rotating. As a consequence, a position error is made, changing as is indicated by the broken curve 82 in FIG. 8. During the initial learning operation, the CPU 10 learns the disk runout represented by the broken curve 82 and calculates a learned value. The CPU 10 performs servo compensation on the basis of the learned value, thus suppressing the disk runout as indicated by a solid curve 81 shown in FIG. 8. The position error therefore converges with time. The one-dot, dashed lines 83 shown in FIG. 8, represent the convergence of the learned value. As the position error gradually decreases, the learning operation is more correctly carried out and the learned value becomes less erroneous.

Figure 9:
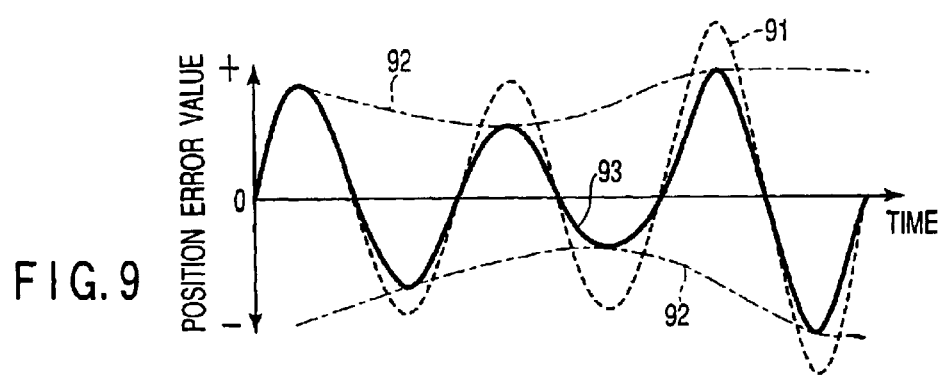
Figure 10:
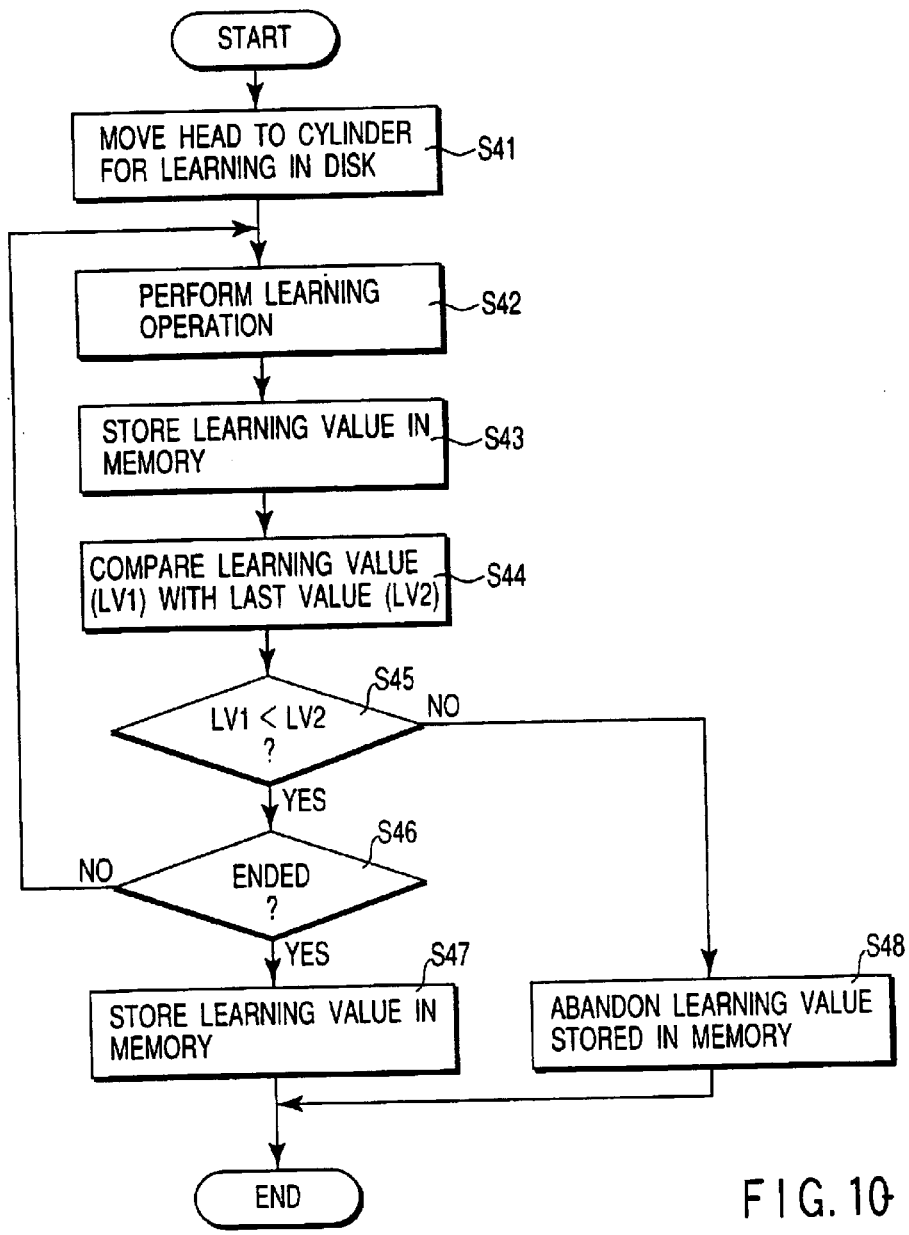
FIG. 10 is a flowchart explaining the sequence of the learning operation carried out in a servo system according to the third embodiment of the invention.

If an external disturbance is applied to the feedback control system of the servo system as shown in FIG. 2, however, the position error relatively increases as is illustrated by the broken curve 91 in FIG. 9. If the learning operation is performed on the basis of the position error influenced by the external disturbance, the servo-compensated position error will increase, too, as can be understood from the solid curve 93 shown in FIG. 9. Thus, the learned value will not converge, as is indicated by the one-dot, dashed curves 92 indicate in FIG. 9. If the servo compensation is carried out in accordance with such a learned value affected by the external disturbance, the precision of head positioning will greatly lower in the feedback control system.

The learning operation is carried out in the third embodiment, in accordance with the convergence of the learned value, as will be described in detail with reference to the flowchart of FIG. 10.

First, the CPU 10 moves the head 2 to the learning cylinder designated on the disk 1 (Step S41). The CPU 10 performs an learning operation while the disk 1 is rotating once, calculating a learned value LV2 (corresponding to the disk runout) from the position error E (Step S42). Further, the CPU 10 stores the learned value LV2 for one rotation of the disk 1, into the memory 11 (Step S43).

Then, the CPU 10 carries out a learning operation for another rotation of the disk, obtaining a learned value LV1, and compares the learned value LV1 with the learned value LV2 during the previous rotation of the disk 1 (Step S44). The CPU 10 determines whether or not the value LV1 is smaller than the value LV2 (Step S45). If YES, that is, if the learned value is converging, the CPU 10 determines whether the learning operation has ended or not (Step S46). If YES, the CPU 10 stores the learned value LV1 into the memory 11 (Step S47).

If the value LV1 is not smaller than the value LV2, the CPU 10 determines that the learned value is not converting and is therefore erroneous. In this case, the CPU 10 abandons the learned values VL1 and VL2, both stored in the memory 11 (Step S48). In practice, the CPU 10 sets "0" as the learned value for the head number, as described above.

Thus, the CPU 10 can infer that an erroneous learned value has been calculated due to an external disturbance or the like, if the learned value obtained by the learning operation is converging. In this case, the CPU 10 abandons the erroneous learned value. No erroneous learned values are used in the feedback control system that effects the head positioning control. This prevents an excessive decrease in the precision of head positioning.

(Modification of the Third Embodiment)

Figure 11:
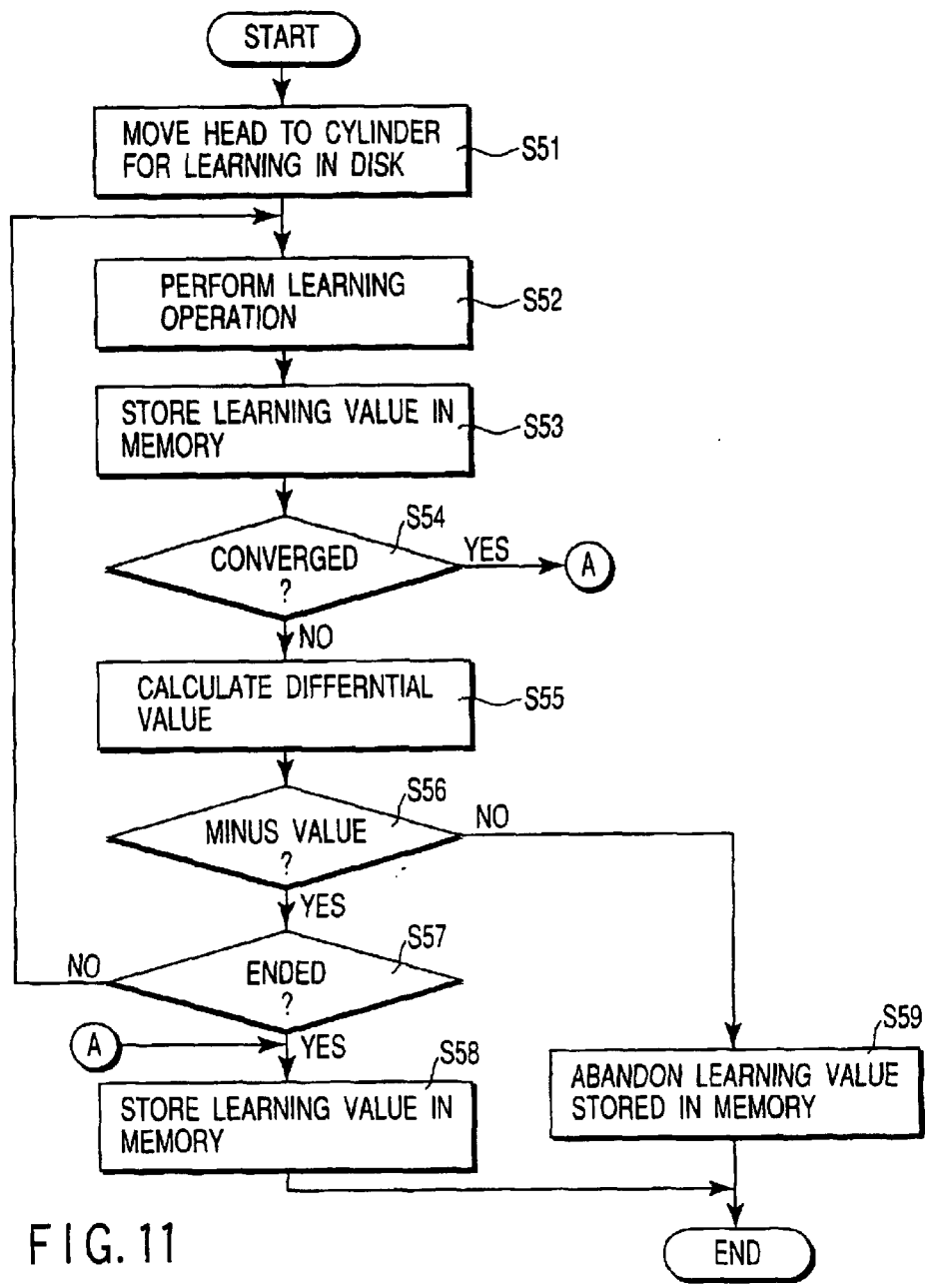
FIG. 11 is a flowchart explaining the sequence of the learning operation performed in a servo system according a modification of the third embodiment.

FIG. 11 is a flowchart explaining the sequence of the learning operation performed in a modification of the third embodiment.

The modification is a servo system in which a differential value is calculated from a learned value. If the differential value is less than 0, it is determined that the learned value is converging. If the differential value is greater than 0, it is determined that the learned value is an erroneous one.

First, the CPU 10 moves the head 2 to the learning cylinder designated on the disk 1 (Step S51). Then, the CPU 10 performs a learning operation while the disk 1 is rotating once, calculating a learned value (Step S52). Further, the CPU 10 stores the learned value into the memory 11 (Step S53).

Next, the CPU 10 determines whether the learned value stored in the is converging or not (Step S54). The CPU 10 may make this decision by the same method as in the third embodiment, namely by comparing the two latest learned values calculated. If NO, the CPU 10 calculates a differential value from the latest learned value (Step S55). Then, it is determined whether the differential value is less than 0 or not (Step S56). If YES, the CPU 10 determines whether the learned value is converging within a preset value or not (Step S57). If YES, the CPU 10 stores the learned value into the memory 11 (Step S58).

If NO in Step S56, that is, if the differential value is not less than 0 due to an external disturbance or the like, the CPU 10 abandons the learned value stored in the memory 11 (Step S59).

Thus, the CPU 10 can infers that the learned value is erroneous due to the external disturbance or the like, from the differential value obtained from the learned value. The CPU 10 then abandons the erroneous learned value. In practice, the CPU 10 sets "0" as a learned value in the memory 11, as has been described above. It is therefore possible to prevents an excessive decrease in the precision of head positioning, that may result from servo compensation that uses erroneous learned values.

(Fourth Embodiment)

Figure 12:
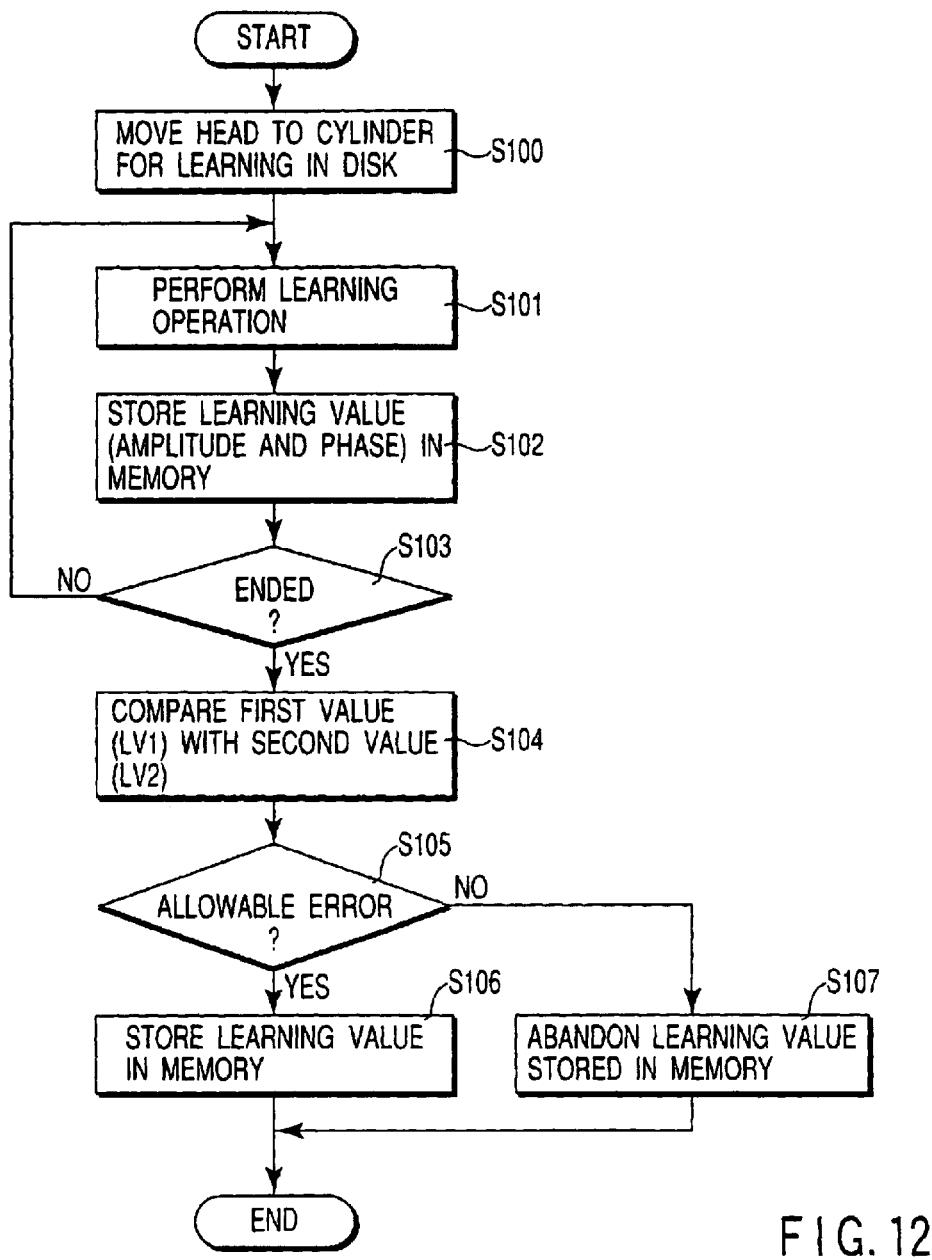
FIG. 12 is a flowchart illustrating the sequence of the learning operation performed in a servo system according to the fourth embodiment of the invention.

FIG. 12 is a flowchart illustrating the sequence of the learning operation performed in a servo system according to the fourth embodiment of the invention. In the fourth embodiment, whether the learned value calculated in the learning operation is erroneous or not is determined in accordance with the amplitude and phase of the learned value.

How a disk runout is obtained from a position error E in the fourth embodiment will be explained first.

If a Fourier series is developed from the position error E, the first-order component L1, second-order component L2, third-order component L3, . . . , and nth-order component LN will be given as follows:

$$L1 = \alpha 1 \sin(1*2\pi/T*t) + \beta 1 \cos(1*2\pi/T*t)$$

$$L2 = \alpha 2 \sin(2*2\pi/T*t) + \beta 2 \cos(2*2\pi/T*t)$$

$$L3 = \alpha 3 \sin(3*2\pi/T*t) + \beta 3 \cos(3*2\pi/T*t)$$

$$Ln = \alpha n \sin(n*2\pi/T*t) + \beta n \cos(n*2\pi/T*t) \quad (1)$$

where T is the time the SPM 3 needs to rotate once, t is the time the SPM 3 keeps rotating, $\alpha 1$ to $\alpha n$ are the first-order to nth-order learning coefficients, and $\beta 1$ to $\beta n$ are the first-order to nth-order learning coefficients.

A learned value N can be found as follows:

$$L = \text{sqrt}(\alpha n\hat{\ }2 + \beta n\hat{\ }2)*\sin(n*2\pi/T+\theta) \quad (2)$$

where sqrt is a square root.

Each component Ln synchronous with the rotation of the SPM 3 is obtained as indicated by the equation (1).

The compensation units C2a and C2b, both shown in FIG. 2, perform the operation of the following equation (3), thereby calculating a servo compensation value Uf.

$$Uf = (1 + C1*P)/P*L \quad (3)$$

where L=L1+L2+L3+ . . . +Ln, C1 is the output (control value) of the controller C1, and P is the output of the plant P.

If the disk runout occurs repeatedly, the amplitude A (=sqrt ($\alpha\hat{\ }2 + \beta\hat{\ }2$)) and phase $\theta$ of the learned value L will have almost the same value as before. If an external disturbance is applied to the servo system as shown in FIG. 2, however, neither the amplitude A nor the phase $\theta$ will have the same value as before.

In the servo system according to the fourth embodiment, the learning operation is repeated several times at the same learning cylinder. If the amplitude A or the phase $\theta$ does not have the same value again, it is determined that an erroneous learned value has been calculated due to an external disturbance or the like. In this case, the learned value calculated last is abandoned. The sequence of the learning operation will be described below, with reference to the flowchart of FIG. 12.

First, the CPU 10 moves the head 2 to the learning cylinder designated on the disk 1 (Step S100). Then, the CPU 10 performs a learning operation several times, calculating a learned value upon completing each learning operation (Step S101). The CPU 10 stores the amplitude A and phase $\theta$ of each learned value into the memory 11 (Step S102).

Upon finishing the second learning operation, the CPU 10 compares the first learned value and the second learned value in terms of amplitude A and phase $\theta$ (Step S104). It is then determined whether the amplitude difference and phase difference between the first and second learned values are equal to or less than the preset values (Step S105). If YES, the CPU 10 stores one of the learned values compared (e.g., the first learned value) into the memory 11 (Step S106).

If NO in Step S105, the CPU 10 infers that the latest learned value is erroneous and abandons the latest learned value (Step S107). In practice, the CPU 10 sets "0" as a learned value in the memory 11, as has been described above.

(Fifth Embodiment)

Figure 13:
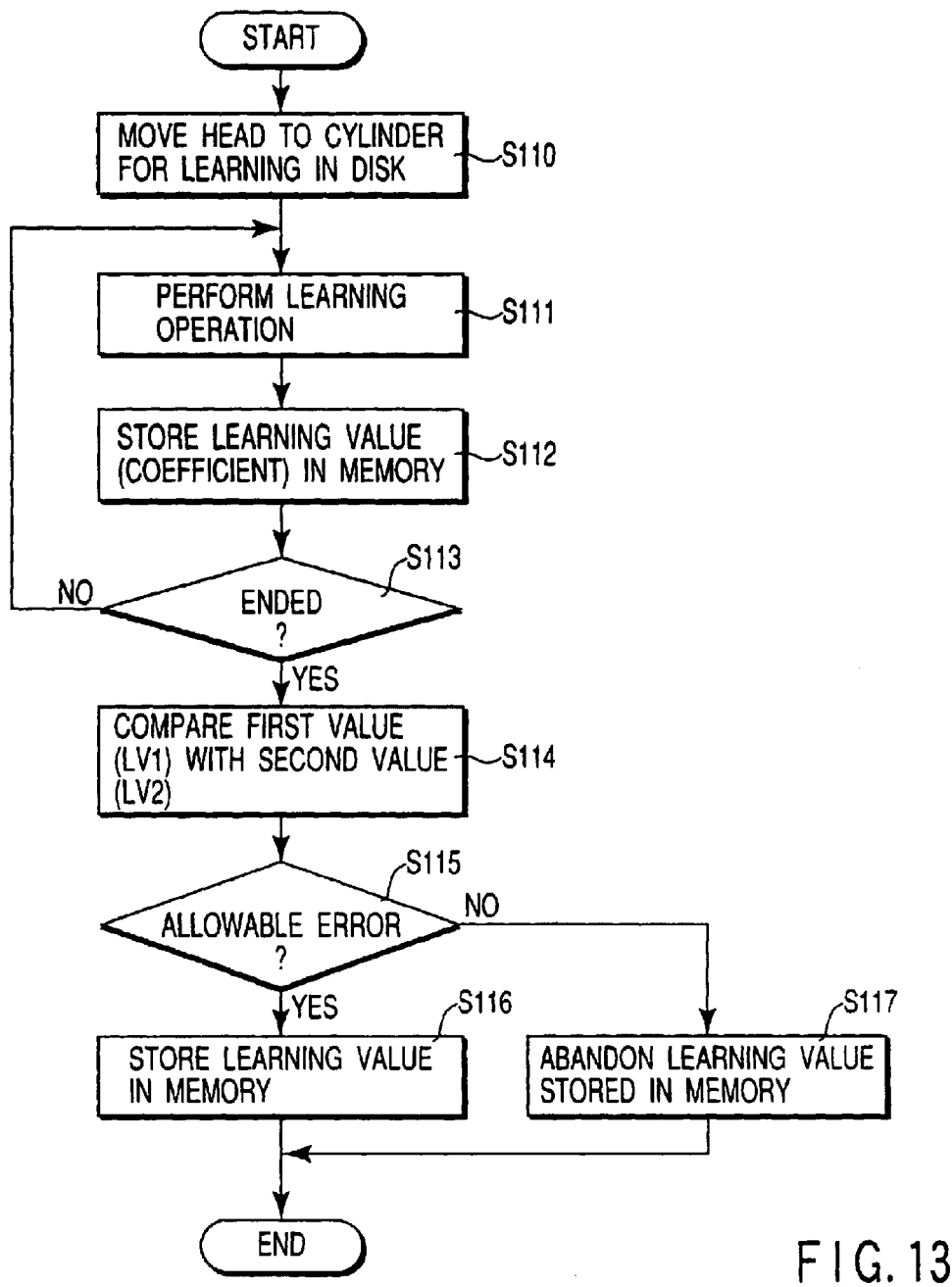
FIG. 13 is a flowchart explaining the sequence of the learning operation carried out in a servo system according to the fifth embodiment of this invention.

FIG. 13 is a flowchart explaining the sequence of the learning operation carried out in a servo system, which is the fifth embodiment of the invention.

In the fifth embodiment, whether the learned value calculated in the learning operation is erroneous or not is determined in accordance with the learning coefficients $\alpha 1$ to $\alpha n$ and $\beta 1$ to $\beta n$, all mentioned above in conjunction with the equation (1). How the learning operation is carried out in the fifth embodiment will be described below, with reference to the flowchart of FIG. 13.

First, the CPU 10 moves the head 2 to the learning cylinder designated on the disk 1 (Step S110). Then, the CPU 10 performs a learning operation several times, calculating a learned value upon completing each learning operation (Step S111). The CPU 10 stores the learning coefficient of each learned value into the memory 11 (Step S112).

Upon finishing the second learning operation, the CPU 10 compares the first and second learning coefficients (Step S114). It is determined whether the difference between the first and second learning coefficients is equal to or less than a preset values (Step S115). If YES, the CPU 10 stores one of the coefficients compared (e.g., the first learning coefficient) into the memory 11 (Step S116).

If NO in Step S115, the CPU 10 infers that the latest learned value is erroneous and abandons the latest learned value (Step S117). In practice, the CPU 10 sets "0" as a learned value in the memory 11, as has been described above.

(Sixth Embodiment)

Figure 14:
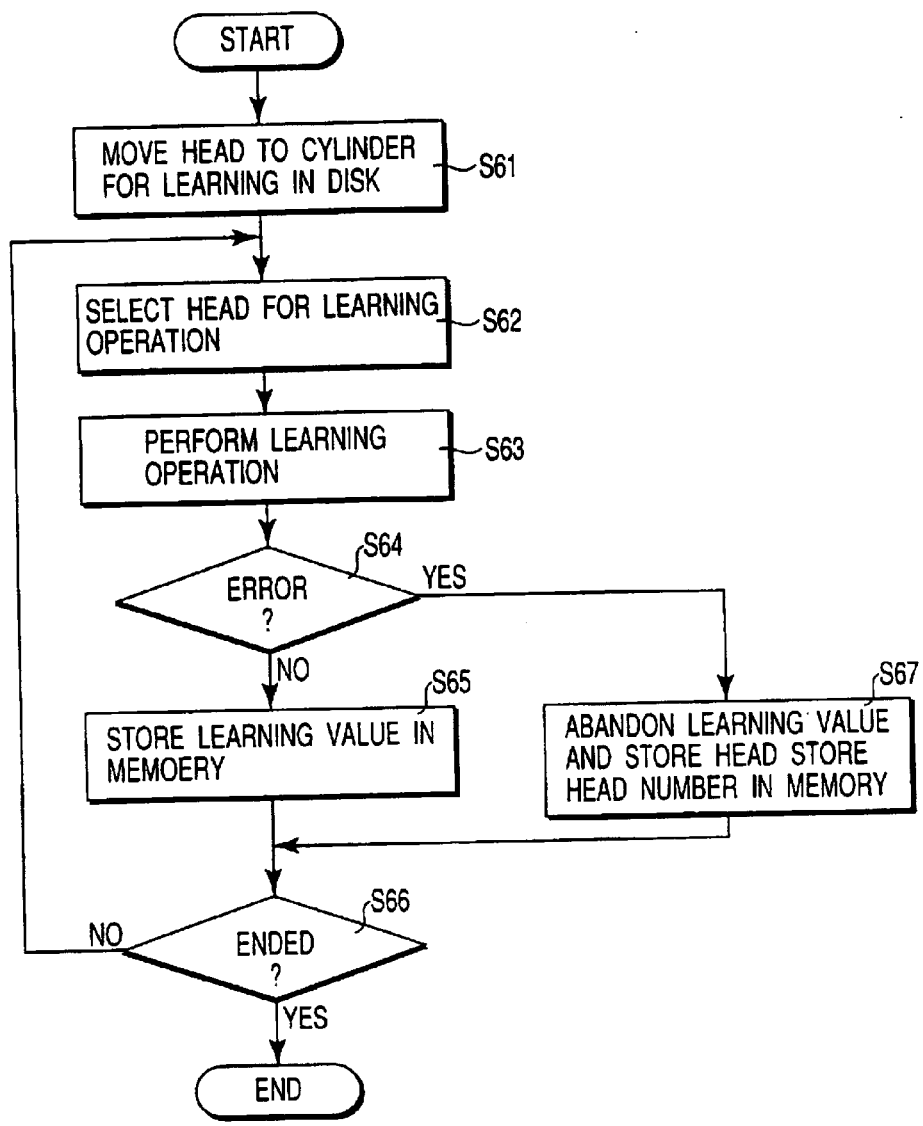
FIGS. 14 and 15 are flowcharts illustrating the sequence of the learning operation performed in a servo system according to the sixth embodiment of the invention.
Figure 15:
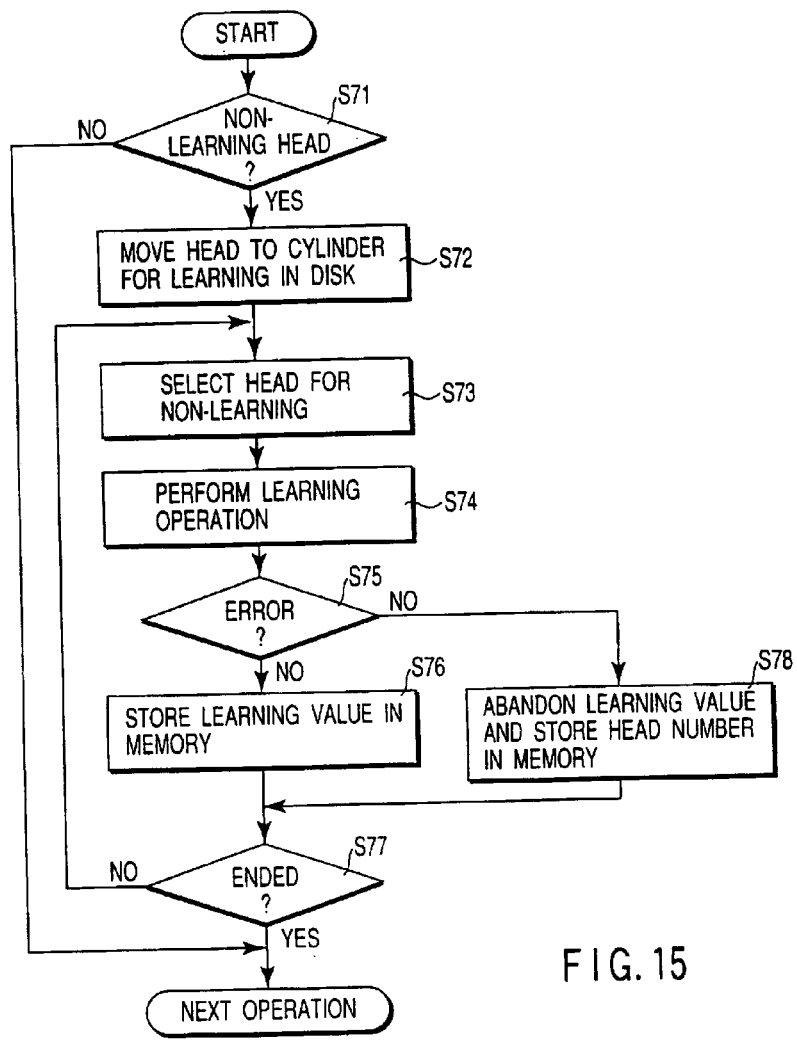

FIGS. 14 and 15 are flowcharts illustrating the sequence of the learning operation performed in a servo system according to the sixth embodiment of the invention.

In the sixth embodiment, the number of the head that is positioned when an erroneous learned valued is calculated is stored in a memory. When a host system supplies the next read/write command to the disk drive, the learning operation is performed by using the head identified by the head number stored in the memory.

The sequence of the learning operation carried out in the sixth embodiment will be described below, with reference to the flowchart of FIGS. 14 and 15.

As shown in FIG. 14, the CPU 10 moves the head 2 to the learning cylinder designated on the disk 1 (Step S61). Then, the CPU 10 selects one of the heads (Step S62) and performs a learning operation by using the head selected (Step S63). The CPU 10 determines whether an erroneous learned value has been calculated or not, by the same method as used in the each embodiment described above (Step S64). If NO, the CPU 10 stores the learned value into the memory 11, together with the number of the head selected (Step S65).

If YES in Step S64, the CPU 10 abandons the learned value (Step S67). More precisely, the CPU 10 sets "0" as a learned value in the memory 11 and stores into the memory 11 the number of the head located at the learning cylinder when the erroneous learned value was calculated. Then, the CPU 10 determines whether or not all heads have been used to effect the initial learning operation (Step S66). If NOT, Steps S62, S63, S64, S65 and S67 are repeated.

How the learning operation is performed by using the head identified by the number stored in the memory 11 will be explained, with reference to the flowchart of FIG. 15.

The CPU 10 receives a read/write command generated by the host system and starts performing a normal read/write operation. The CPU 10 determines whether the memory 11 stores a head number "0" (Step S71). Note that the head number "0" identifies a head not used to perform a learning operation because an erroneous learned value has been calculated in the initial learning operation. If NO in Step S71, the CPU 10 carries out the normal read/write operation.

If YES in Step S71, the CPU 10 moves the head not used for learning operation, to the learning cylinder (Step S72). Further, the 10 selects this head (Step S73). Using the head selected, the CPU 10 performs a learning operation similar to the initial learning operation, calculating a learned value (Step S74). Then, the CPU 10 determines whether the learned value is erroneous or not (Step S75). If NO, the CPU 10 stores the learned value into the memory 11 (Step S6).

If YES in Step S75, the CPU 10 abandons the learned value and stores the head number again into the memory 11 (Step S78). The CPU 10 determines whether or not all heads have been used to effect the initial learning operation (Step S77). If NOT, Steps S72, S73, S74, S75, S76 and S78 are repeated.

In the sixth embodiment, the number of the head used to effect the initial learning operation is stored into the memory 11 if the learned value calculated in the learning operation is erroneous. The head is used again to perform a learning operation in response to a read/write command. Hence, the possibility of calculating a correct learned value increases even if there remains a condition in which erroneous learned values may be calculated. The head may be used again to effect a learning operation, in response to not only a read/write command, but also an idle command.

(Seventh Embodiment)

Figure 16:
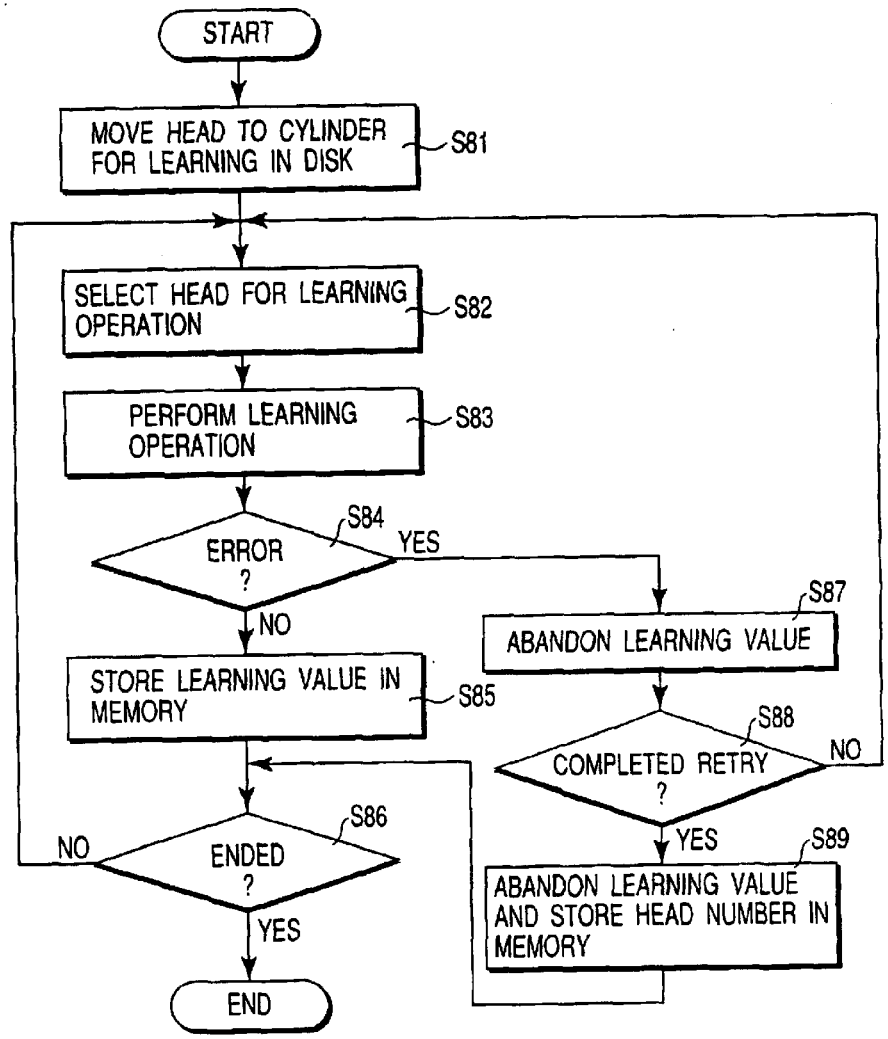
FIG. 16 is a flowchart showing the sequence of the learning operation performed in a servo system according to the seventh embodiment of this invention.

FIG. 16 is a flowchart showing the sequence of the learning operation performed in a servo system according to the seventh embodiment of this invention. In the seventh embodiment, the number of times the learning operation can be repeated is limited.

The sequence of the learning operation carried out in the seventh embodiment will be described below, with reference to the flowchart of FIG. 16.

First, the CPU 10 moves the head 2 to the learning cylinder designated on the disk 1 (Step S81). Then, the CPU 10 selects one of the heads (Step S82) and performs a learning operation by using the head selected (Step S83).

The CPU 10 determines whether an erroneous learned value has been calculated or not, by the same method as used in the each embodiment described above (Step S84). If NO, the CPU 10 stores the learned value into the memory 11, together with the number of the head selected (Step S85).

If YES in Step S84, the CPU 10 abandons the learned value (Step S87). That is, the CPU 10 stores "0" into the memory 11 as the learned value for the head identified by the number stored in the memory. In this case, the learning operation is repeated a prescribed number of times. The CPU 10 determines whether or not the learning operation has been the prescribed number of times (Step S88). If NO in Step S88, Steps S82, S83, S84, S87 and S88. If YES in Step S88 and if the learned value calculated is erroneous, the Then, the CPU 10 abandons the learned value and stores the number of the head into the memory 11 (Step S89). The CPU 10 determines whether or not all heads have been used to effect the learning operation (Step S86). If NOT in Step S86, Steps S82, S83, S84, S85 and S86 are repeated. If YES in Step S86, the initial learning operation is terminated.

Once the learned value is abandoned, no servo compensation values Uf are supplied to the feedback control system. The precision of head positioning may therefore decrease. The learning operation repeated may be repeated more times than prescribed may serve to calculate a correct learned value. If the learning operation is repeated many times, however, the performance of the disk drive will degrade. Hence, the number of times the learning operation can be repeated is limited, thereby preventing the performance of the disk drive from degrading.

(Eighth Embodiment)

Figure 17:
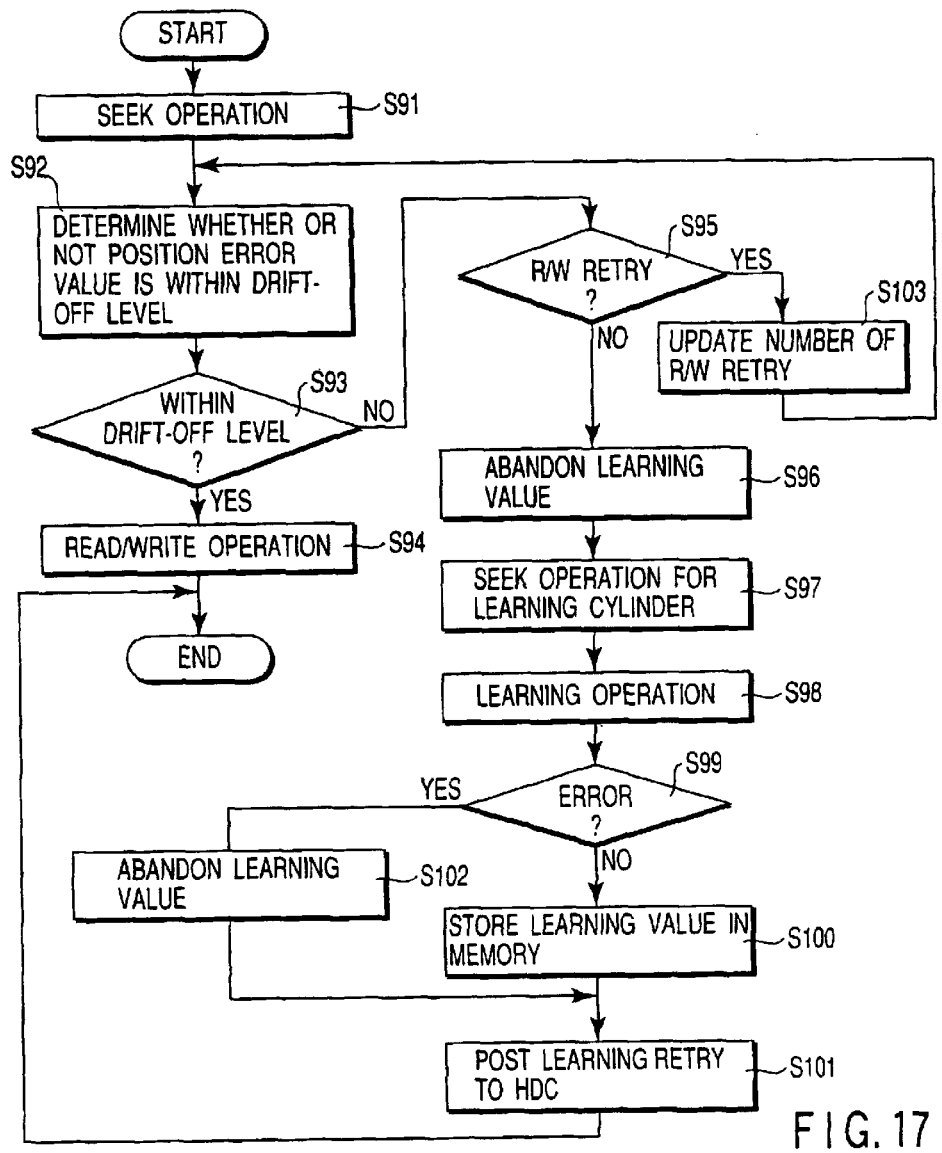
FIG. 17 is a flowchart explaining the sequence of the learning operation carried out in a servo system according to the eighth embodiment of this invention.

FIG. 17 is a flowchart explaining the sequence of the learning operation carried out in a servo system according to the eighth embodiment of the invention.

In the eighth embodiment, the latest learning value calculated is abandoned and the learning operation is carried out again, if the precision of head positioning decreases (that is, if a drift-off occurs) during the normal read/write operation after the initial learning operation has been performed.

The sequence of the learning operation carried out in the seventh embodiment will be described below, with reference to the flowchart of FIG. 17.

Upon receipt of a read/write command via the HDC 9 from the host system, the CPU 10 moves the head 2 to the desired cylinder that is to be accessed (Step S91). Then, the CPU 10 determines whether the position error obtained from the servo data has a level lower than a preset drift-off level (Steps S92, S93). If YES, the CPU 10 performs a read/write operation (Step S94).

If NO in Step S93, that is, if the position error has a level equal to or higher than the drift-off level, indicating that the precision of head positioning has decreased below a tolerance value, the CPU 10 inhibits the read/write operation and determined whether the read/write operation is tried or not (Step S95). If YES, the HDC 9 updates the number of read/write trials set in a retry counter, thereby instructing that the read/write operation be carried out again (Step S103). Thus, the CPU 10 repeatedly try to effect the read/write operation a prescribed number of times.

In NO in Step S95, that is, if the read/write operation is no longer tried because the precision of head positioning remains below the tolerance value, the CPU 10 infers that the servo compensation value Uf supplied from the feedforward control system to the feedback control system is an erroneous one. Thus, the CPU 10 abandons the learned value calculated last (Step S96). In practice, the CPU 10 sets "0" in memory 11, as the learned value for the head used to perform the learning operation.

The CPU 10 then moves the head 2 to the learning cylinder (Step S97) and performs the learning operation again by using the head 2 (Step S98). The CPU 10 determines whether an erroneous learned value has been calculated or not (Step S99). If NO, that is, if the learning operation has been performed correctly, the CPU 10 stores the learned value into the memory 11 (Step S100). In this case, the CPU 10 informs the HDC 9 that the learning operated has been tried again (Step S101).

If YES in Step S99, the CPU 10 abandons the learned value (Step S102). In practice, the CPU 10 stores "0" into the memory 11 as the learned value for the head to be used to achieve a learning operation. In this case, too, the CPU 10 informs the HDC 9 that the learning operated has been tried again (Step S101).

As indicated above, the learned value calculated for the head is very likely erroneous if the precision of head positioning has decreased below the tolerance value, causing a drift-off. If so, the CPU 10 performs the learning operation again, thereby updating the learned value (or abandon the learned value). This renders it possible to prevent the precision of head positioning from decreasing below the tolerance.

As has been described, the present invention can provide a disk drive having a servo system which has a learning function. In the disk drive, the learned value is abandoned if it is erroneous due to an external disturbance or the like applied to the disk drive. The precision of head positioning is thereby prevented from decreasing. Further, if the learned value is erroneous, the learning operation may be performed again to obtain a correct learned value, whereby a reliable, high-precision head positioning control is accomplished.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disk drive comprising:

a disk having a data area for recording data and a servo area in which servo data is prerecorded;

a head for performing a normal read/write operation of reading and writing data in and from the data area and for reading the servo data from the servo area to achieve a head positioning control;

actuator means supporting the head and designed to move the head to a desired position on the disk;

servo means for calculating, from the servo data read by the head, a position error which the head has with respect to the desired position during the head positioning control, and for calculating, from the position error, a control value for driving the actuator means;

learning means for calculating, from the position error, a learned value relating to a disk-runout occurring while the disk is rotating;

learning control means for determining whether the learned value deviates from a prescribed tolerance value and for abandoning the learned value when the learned value is erroneous and deviating from the prescribed tolerance value;

servo compensation means for compensating for the control value by using the learned value, when the learned value is an effective one while the servo means is performing the head positioning control during the normal read/write operation and;

detecting means for detecting an impact resulting from an external disturbance and in which the learning control means abandons the learned value calculated by the learning means, when the detecting means detects an impact that exceeds a prescribed value.

* * * * *